United States Patent [19]

Logan et al.

[11] Patent Number: 5,700,028
[45] Date of Patent: Dec. 23, 1997

[54] AIR BAG MODULE WITH ENERGY ABSORBING MOUNTING BRACKET

[75] Inventors: Jeffrey Allen Logan, Union; John Clifford Hattery, Jr., Dublin; John Paul Sparkman, Dayton; David Allan Pray, Tipp City, all of Ohio

[73] Assignee: General Motors Corporation, Detroit, Mich.

[21] Appl. No.: 649,040

[22] Filed: May 16, 1996

Related U.S. Application Data

[63] Continuation-in-part of Ser. No. 618,322, Mar. 19, 1996.
[51] Int. Cl.$^6$ .................................................. B60R 21/20
[52] U.S. Cl. ............................ 280/728.2; 280/728.3; 280/730.2
[58] Field of Search ............... 280/728.2, 730.2, 280/730.1, 732, 728.3, 728.1, 736, 740, 741

[56] References Cited

U.S. PATENT DOCUMENTS

| | | | |
|---|---|---|---|
| 4,153,273 | 5/1979 | Risko | 280/728.2 |
| 5,092,627 | 3/1992 | Igawa | 280/728.2 |
| 5,112,079 | 5/1992 | Haland et al. | 280/730.2 |
| 5,445,407 | 8/1995 | Lotspih | 280/728.2 |
| 5,462,305 | 10/1995 | Hamada | 280/728.2 |
| 5,498,030 | 3/1996 | Hill et al. | 280/743.1 |
| 5,533,750 | 7/1996 | Karlow et al. | 280/728.2 |

FOREIGN PATENT DOCUMENTS

| | | | |
|---|---|---|---|
| 6-227352 | 8/1994 | Japan | 280/728.2 |

OTHER PUBLICATIONS

U.S. Patent Application No. 08/609,061, filed Feb. 29, 1996, by Spencer et al.

*Primary Examiner*—Peter C. English
*Attorney, Agent, or Firm*—Kathryn A. Marra

[57] ABSTRACT

An air bag module includes an inflator for generating inflator gas, an air bag deployable upon generation of inflator gas and secured to the inflator, and a mounting bracket attached to the inflator. The mounting bracket is adapted to secure the inflator to the vehicle. The inflator preferably includes opposing ends and the mounting bracket has a central portion secured to the vehicle. The mounting bracket advantageously includes first and second cantilevered portions, each of the cantilevered portions extending outwardly from the central portion and engaging an end of the inflator. The cantilevered portions each having a predetermined strength such that the cantilevered portions each deform in the direction of the deploying air bag such that the mounting bracket absorbs energy during air bag inflation by predetermined deformation of the cantilevered portions.

14 Claims, 9 Drawing Sheets

AIR BAG MODULE WITH ENERGY ABSORBING MOUNTING BRACKET

This application is a continuation-in-part of Ser. No. 08/618,322 filed Mar. 19, 1996, now pending.

This invention relates to an air bag module for use in a vehicle.

BACKGROUND OF THE INVENTION

Conventional air bag module designs require a rigid housing which is anchored to a vehicle body and which houses and supports an inflator and a folded air bag. The housing is typically formed of a sturdy rigid material, such as a stamped, drawn or cast metal. The inflator is typically mounted on and held in position by the ends of the sturdy housing during assembly and inflation. The air bag is typically attached to the housing by a separate sturdy and rigid air bag retainer. The sturdy rigid housing and air bag retainer are designed to generally not deform in the direction of air bag inflation during deployment, such that the air bag must endure the majority of the stresses of the inflator gas during inflation.

The air bag module also typically includes a separate plastic molded cover attached to the housing. The cover typically includes weakened integrally formed tear seams which break open to permit deployment of the air bag therethrough. Prior art covers are typically generally flat due to difficulty in manufacturing when the molded shape of the cover includes complex curvatures resulting in a cover which is difficult to remove from the mold. In addition the prior art covers are difficult to stretch over the air bag and around or within a housing for attachment thereto. Thus, prior art modules have the shortcoming of requiring multiple rigid and relatively heavy components fastened together to house and attach the inflator and air bag.

Air bag modules are now being contemplated for use in vehicle locations having narrow space constraints, such as vehicle seats, doors, roofs or other side structure. Thus, it is continually desirable to reduce the size and weight of the air bag module to improve packaging.

SUMMARY OF THE INVENTION

This invention provides an improved air bag module which preferably is easy to manufacture and assemble. The air bag module preferably includes a mounting bracket which is designed to be deformable by a predetermined amount during air bag deployment for absorbing energy and reducing stresses on the air bag. The module also preferably includes a container having features which enable ease of assembly of the module. Advantageously, this invention preferably provides a lightweight module which is easily adaptable for packaging in vehicle locations with narrow or odd-shaped packaging constraints, such as a vehicle seat.

These advantages are accomplished in a preferred embodiment by providing an air bag module including an inflator for generating inflator gas, an air bag deployable upon generation of inflator gas and secured to the inflator, and a mounting bracket attached to the inflator. The mounting bracket is adapted to secure the inflator to the vehicle. The inflator preferably includes opposing ends and the mounting bracket has a central portion secured to the vehicle. The mounting bracket advantageously includes first and second cantilevered portions, each of the cantilevered portions extending outwardly from the central portion and engaging an end of the inflator. The cantilevered portions each having a predetermined strength such that the cantilevered portions each deform in the direction of the deploying air bag such that the mounting bracket absorbs energy during air bag inflation by predetermined deformation of the cantilevered portions. Preferably, the inflator has an elongated axis which is generally parallel to the central portion of the mounting bracket prior to air bag inflation. Each of the cantilevered portions preferably has a predetermined strength such that the cantilevered portions deform generally equally during air bag inflation such that the elongated axis of the inflator remains generally parallel to the central portion of the mounting bracket upon deformation of the cantilevered portions.

In accordance with other preferred aspects of the invention, the first and second cantilevered portions each include a laterally bent end for engaging an end of the inflator. The air bag is preferably slip-fittedly mounted on the inflator and trapped on the inflator between the bent ends of the mounting bracket.

In accordance with yet another preferred aspect, the module includes a container for housing the air bag and inflator therein and the container has walls defining a substantially enclosed container volume. Preferably, the inflator includes an elongated inflator axis and the container includes a plurality of spaced apart ribs extending perpendicular to the elongated axis of the inflator and the ribs define an internal volume of the container for positioning the inflator and air bag within the container and for restraining movement of the inflator relative to the container. Preferably, the container includes a reaction surface extending parallel to the elongated axis of the inflator and extending perpendicular to and engaging the ribs. Also, preferably the container includes a plurality of locating features for positioning the mounting bracket and inflator within the container during assembly.

BRIEF DESCRIPTION OF THE DRAWINGS

An embodiment of the present invention is described below, by way of example only, with reference to the accompanying drawings in which.

DESCRIPTION OF THE PREFERRED EMBODIMENT

Figure 1:
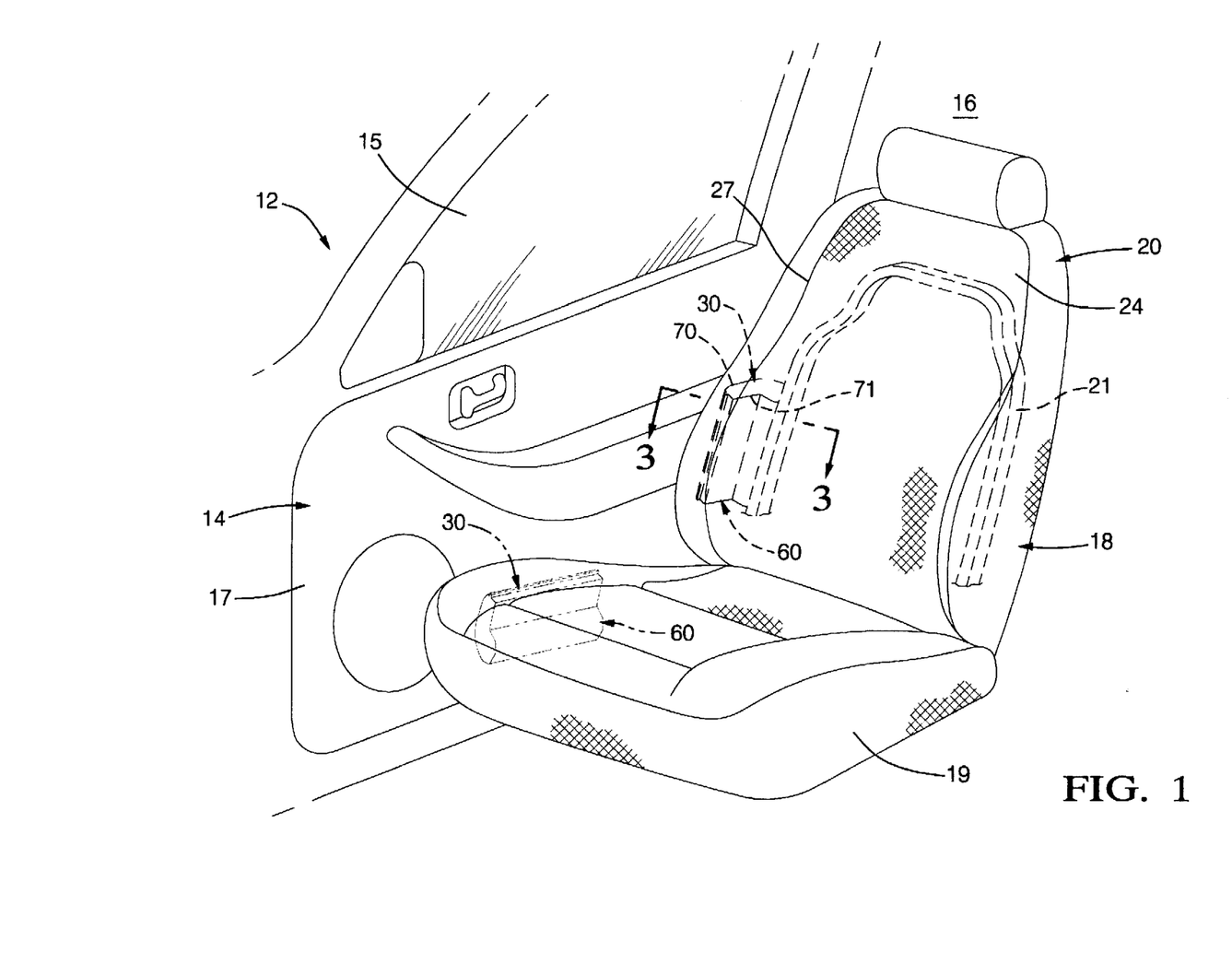
FIG. 1 is a perspective view of a vehicle interior partially broken away and including an air bag module in an undeployed condition.

Referring to FIG. 1, it is seen that a vehicle 12 includes a door 14 having a movable window 15 mounted thereon. An interior 16 of the vehicle 12 includes an inner door panel 17 and a seat 18 for a vehicle occupant (not shown), the seat 18 having a seat bottom 19 and an upper seat back 20. The seat back 20 includes a rigid seat frame 21, preferably being metal, and encompassed within the seat back 20. The seat back 20 is preferably formed of a foam material 23 covered by fabric seat material 24. The seat back 20 preferably includes a vertically extending frangible seat seam 27 proximate the inner door panel 17.

Figure 5:
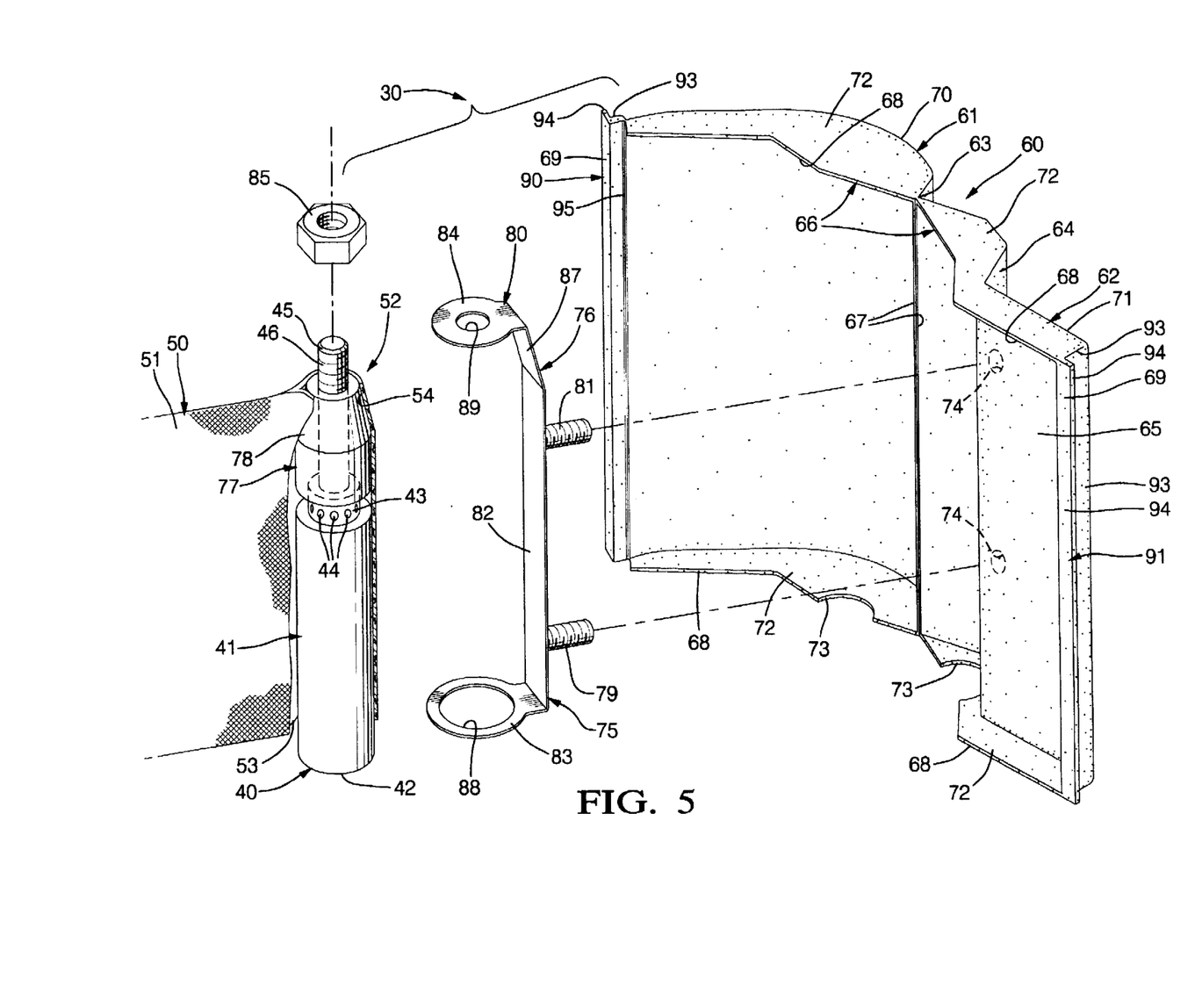
FIG. 5 is a partially exploded perspective view of the module.

FIGS. 5 best illustrates the component parts of a complete air bag module 30 located within the seat back 20. The module 30 generally includes an inflator 40, an air bag 50 for inflation upon generation Of gas by the inflator 40, a clamshell container 60 for housing the inflator 40 and air bag 50 therein, and a mounting bracket 80 for mounting the module 30 to the seat frame 21 and for absorbing energy during air bag deployment, as described below.

As best shown in FIG. 5, the inflator 40 may be of any conventional construction which contains chemicals for igniting to generate gas for discharge upon the existence of predetermined vehicle 12 conditions. The inflator 40 preferably has a hybrid construction including an axially elongated cylindrical inflator body 41 having a plain end 42 and an opposite discharge end 43 including ports 44 through which inflator gas is discharged in a thrust neutral manner to inflate the air bag 50. An axially elongated inflator rod 45 having a threaded end portion 46 preferably extends from the discharge end 43 of the inflator 40 for attachment of the mounting bracket 80, as described further hereinafter. The elongated axis of the inflator 40 is preferably generally vertical and generally parallel with the seat back 20 when the module 30 is mounted in the seat 18.

As best shown in FIG. 5, the air bag 50 is made of any conventional fabric material which is suitable for air bag construction. The air bag 50 includes a folded main body portion 51 which is inflatable to a tubular shape upon the discharge of inflator gas. The air bag 50 also includes a neck portion 52 preferably being an extension of the air bag fabric material. The neck portion 52 includes first and second opposing side openings 53, 54 sized for receiving the inflator 40 therethrough. Preferably, the first side opening 53 is sized larger than the second side opening 54. Preferably, the first side opening 53 is sized for receiving the larger plain end 42 of the inflator 40 therein. Also preferably, the second side opening 54 is tapered and is sized for an interference fit with a tapered spacer 77 disposed on the inflator 40, as described further hereinafter. The neck portion 52 also defines an inner air bag opening through which inflator gas passes to inflate the main body portion 51 of the air bag 50. It will be appreciated that the air bag 50 including the main body portion 51 and the neck portion 52 may be made of a single piece of fabric or several fabric panels joined together.

Figure 2:
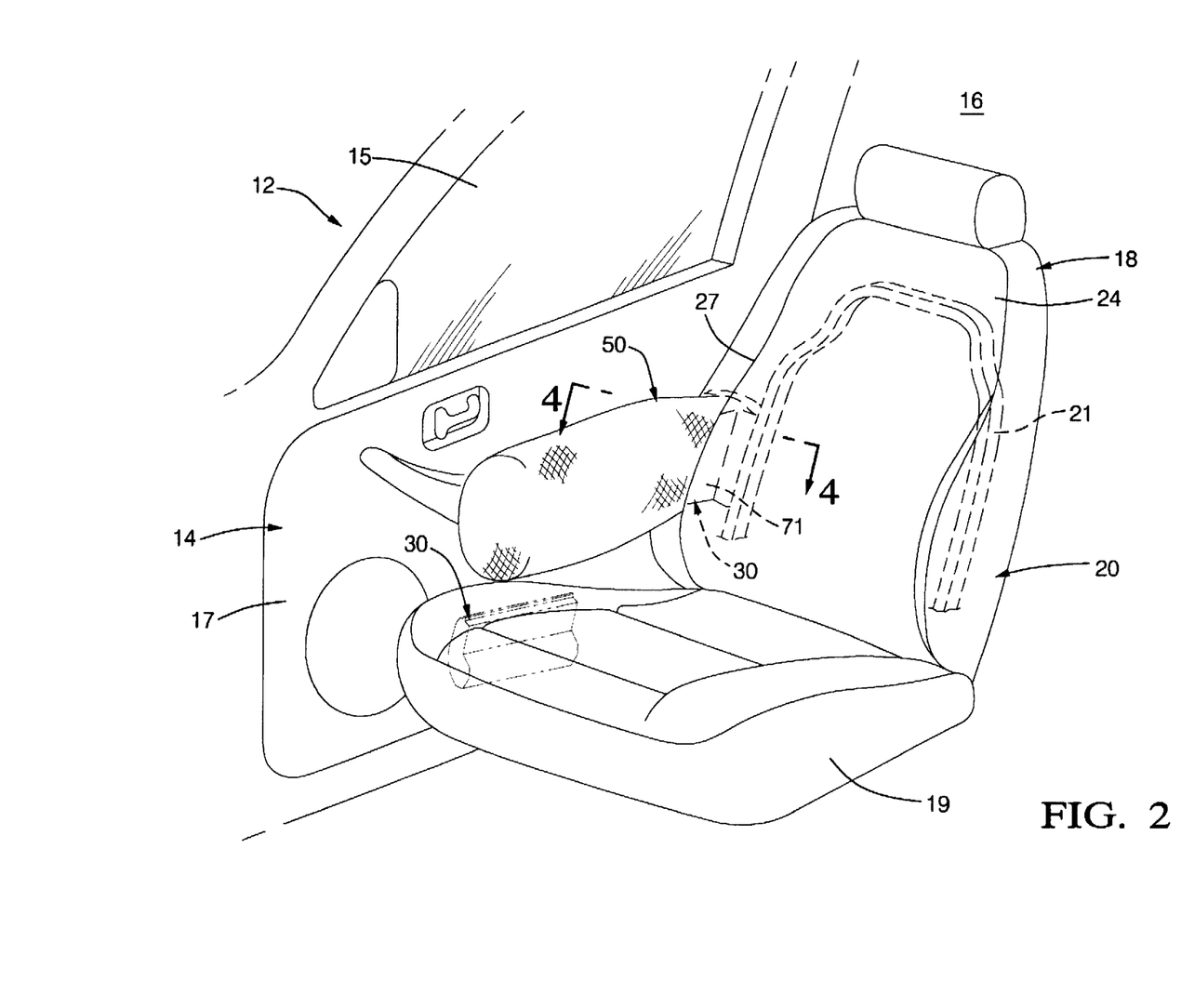
FIG. 2 is a view similar to FIG. 1 but showing the air bag module in a deployed condition.

The main body portion 51 of the air bag 50 preferably includes upper and lower longitudinally extending folds (not shown) such that the main body portion 51 is folded to a height approximately equal to a height of the neck portion 52. The main body portion 51 is then preferably folded into a plurality of accordion-style pleat folds (not shown) for storage within the clamshell container 60. It will be appreciated, however, that other fold arrangements designed to conform to the shape of the clamshell container 60 are also contemplated. While the air bag 50 in FIG. 2 is preferably shown as a longitudinally elongated air bag 50 positioned for protecting the torso portion of an occupant (not shown), it will be appreciated that the air bag 50 may also be positioned higher in the seat back 20 to protect the head portion of the occupant or may have a greater total height for protection of both the torso and head portion of the occupant.

Figure 6:
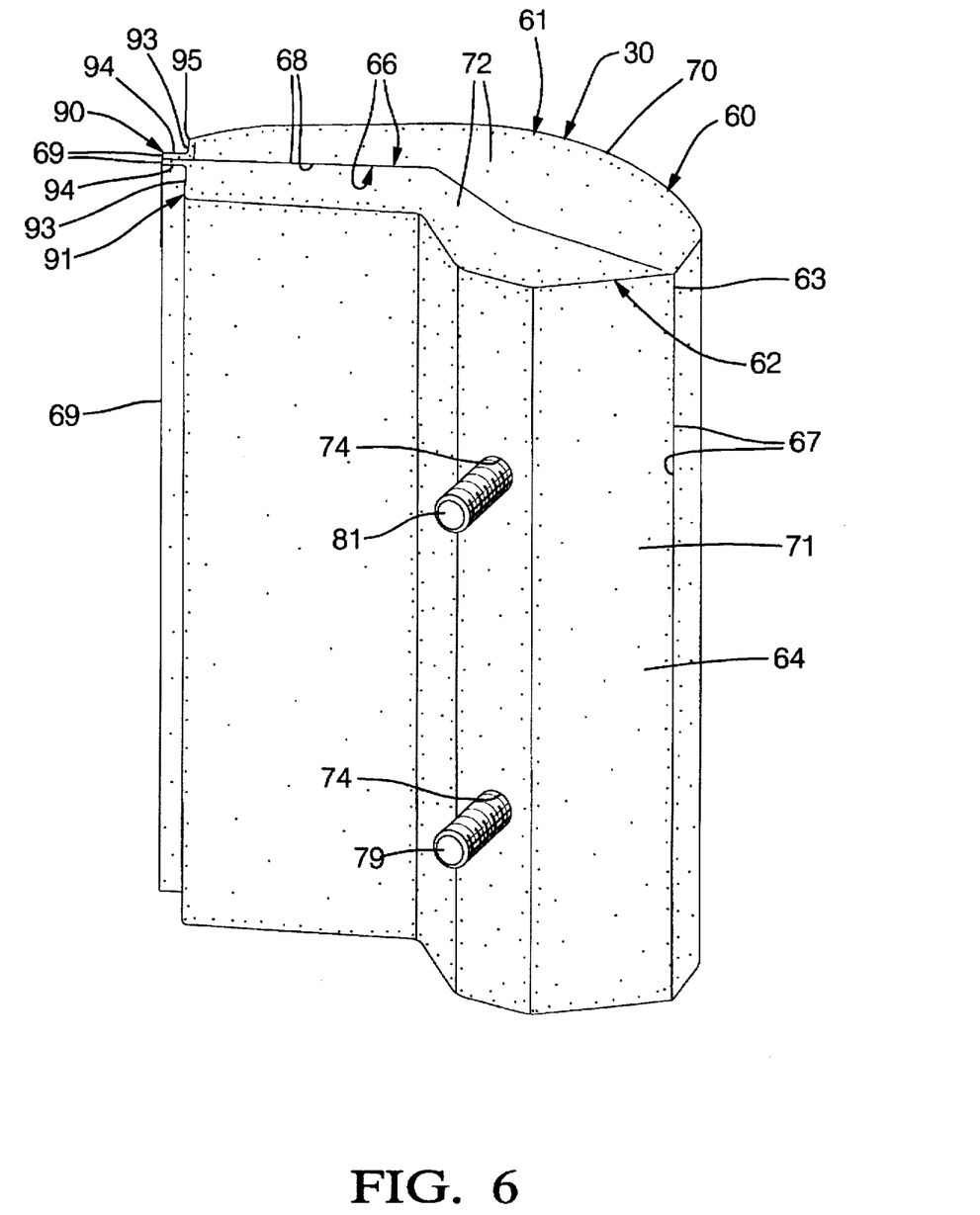
FIG. 6 is a perspective view showing the air bag module in an assembled condition.

As best shown in FIGS. 5 and 6, the module 30 further includes a foldable clamshell container 60 which houses the folded air bag 50 prior to inflation. Advantageously, the clamshell container 60 also preferably houses the inflator 40 and the mounting bracket 80 prior to air bag deployment, thus eliminating the need for a rigid housing and a separate cover. As best shown in FIG. 5, the clamshell container 60 includes a first half 61 and a second half 62 and an integral, bendable, thin closure hinge portion 63 pivotally connecting the first and second halves 61, 62.

As best shown in FIG. 5, the clamshell container 60 has a generally planar, open condition in which the first and second halves 61, 62 each extend outwardly from the closure hinge portion 63. The first and second halves 61, 62 are pivotally connected by the closure hinge portion 63. The closure hinge portion 63 preferably permits pivotal movement of the first and second halves 61, 62 at least 180 degrees relative each other. Thus, the clamshell container 60 is foldable to a closed condition in which the first and second halves 61, 62 are positioned atop each other as best shown in FIGS. 3 and 6.

As best shown in FIG. 5, the clamshell container 60 has an outer surface 64 and an inner surface 65. The first and second halves 61, 62 of the clamshell container 60 each preferably have a generally half-cylindrical shape further defined by perimetric edges 66 including hinged edges 67 integrally attached to the closure binge portion 63, free end edges 68 and deployment edges 69.

Figure 3:
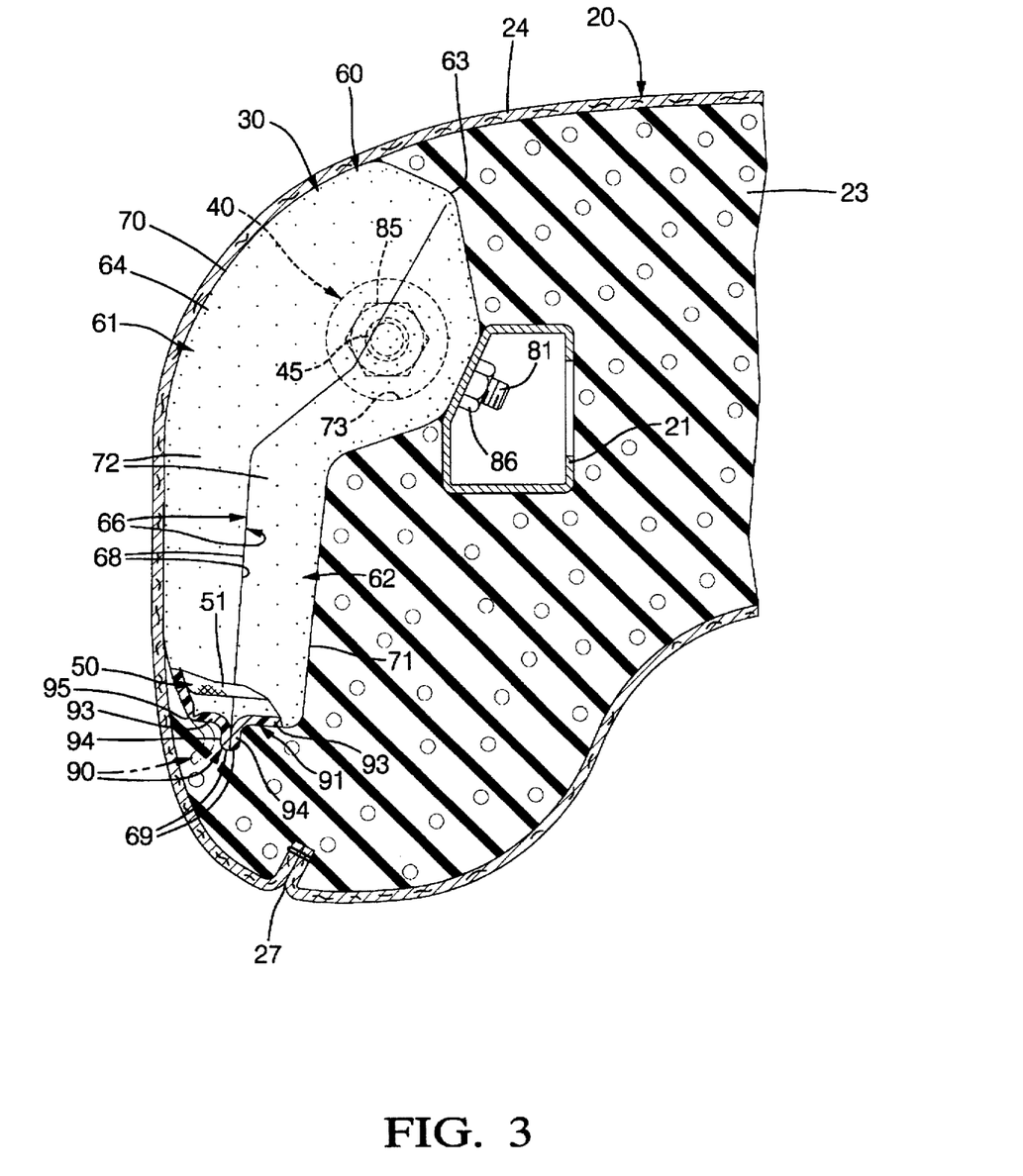
FIG. 3 is a section as viewed along line 3—3 of FIG. 1 and showing the air bag module in the undeployed condition and showing the initial opening of a clamshell container in phantom.

As best shown in the closed condition in FIGS. 3 and 6, the clamshell container 60 includes an outboard side wall 70 on the first half 61, and an inboard side wall 71 on the second half 62, and two pairs of opposing end walls 72. Preferably, the lower pair of end walls 72 cooperatively define an inflator opening 73 through which an electrical connector (not shown) for the inflator 40 extends when the module 30 is assembled. The inboard side wall 71 on the second half 62 preferably includes a set of fastener apertures 74 for receiving mounting fasteners 79, 81 of the mounting bracket 80 therethrough, as described further hereinafter. The walls 70, 71, 72 of the clamshell container 60 cooperatively define a substantially enclosed volume in which the air bag 50, inflator 40 and mounting bracket 80 are stored prior to air bag deployment.

The clamshell container 60 includes a first deployment end portion 90 preferably located longitudinally forward on the first half 61 and a second deployment end portion 91 preferably located longitudinally forward on the second half 62. The first and second deployment end portions 90, 91 preferably each include a laterally extending portion 93 and an outwardly projecting lip portion 94. The lip portions 94 of the deployment end portions 90, 91 are releasably connected to each other prior to air bag deployment. Upon air bag inflation, the air bag 50 forcibly separates the lip portions 94 of the first and second deployment end portions 90, 91 from each other and deploys therebetween. Preferably, the lip portions 94 of the deployment end portions 90, 91 are connected to each other by ultrasonic welding or by heat staking to hold the clamshell container 60 in the closed condition. It will further be appreciated that the deployment end portions 90, 91 may also be connected by any other suitable means, such as mechanical fasteners or a snap-fitted attachment with integrally formed mating features on the first and second halves 61, 62.

Figure 4:
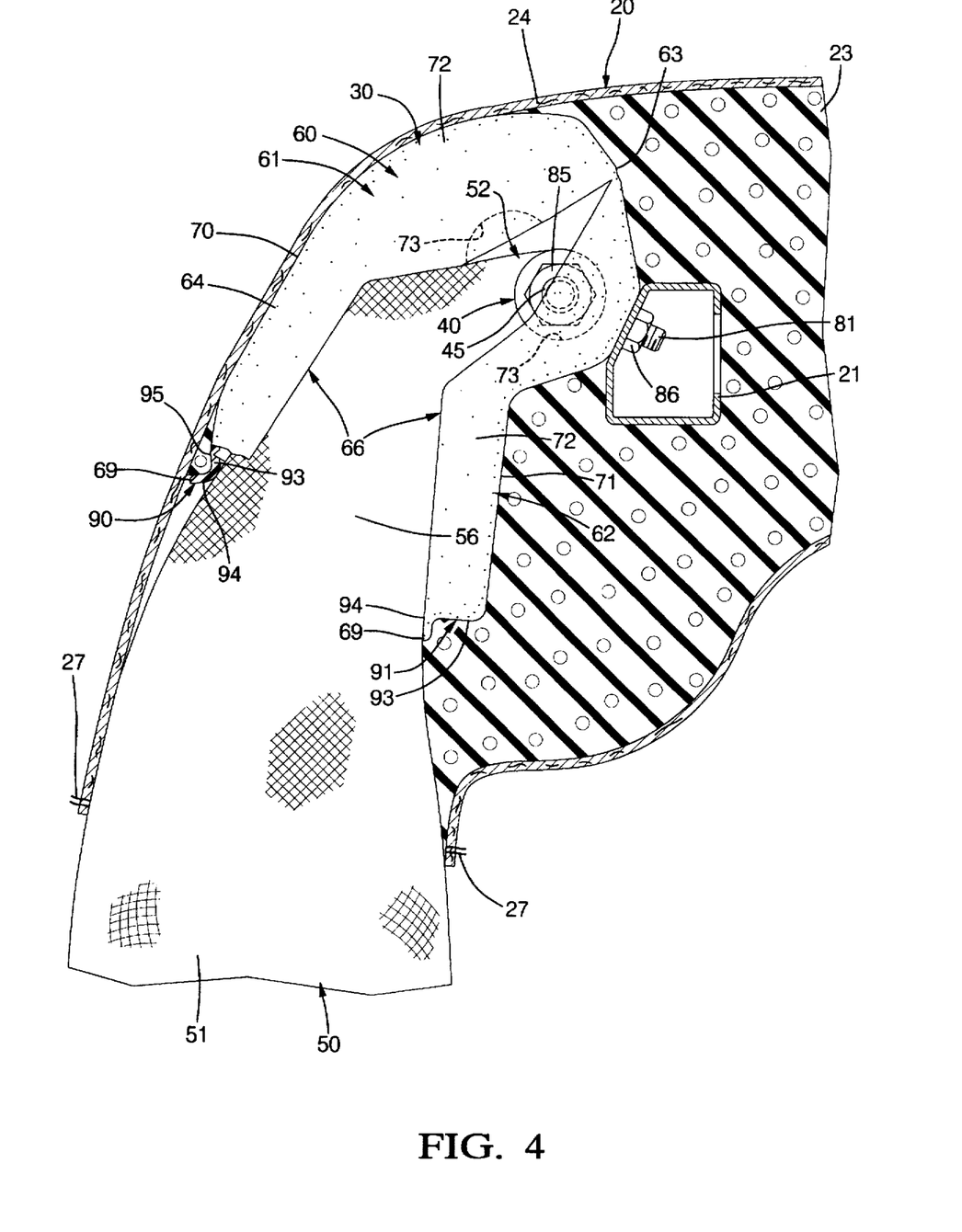
FIG. 4 is a section as viewed along line 4—4 of FIG. 2 and showing the air bag module in the deployed condition.

As best shown in FIGS. 3, 4 and 5, the clamshell container 60 includes a bendable, thin deployment hinge portion 95 pivotally connecting the first deployment end portion 90 to the first half 61 of the clamshell container 60. The deployment hinge portion 95 preferably permits pivotal movement of the first deployment end portion 90 approximately 90 degrees relative the outboard side wall 70 of the first half 61 of the clamshell container 60. Preferably the deployment hinge portion 95 extends along the entire height of the first half 61 of the clamshell container 60. However, it will be appreciated that the deployment hinge portion 95 may only partially extend along the height of the clamshell container 60, especially when the first half 61 has additional complex curvatures. As best shown in FIG. 5, the clamshell container 60 is preferably integrally molded as one piece in the open condition wherein the closure hinge portion 63 and the deployment hinge portion 95 are rotated open such that the clamshell container 60 has positive die angles for easy removal from the mold.

It is critical that the integral connection of the deployment hinge portion 95 to the first half 61 be stronger than the connection between the lip portions 94. Thus, upon air bag deployment, the lip portions 94 should separate from each other and the deployment hinge portion 95 should remain attached to the first half 61 of the clamshell container 60.

The entire clamshell container 60 is preferably integrally molded as a single component from a suitable polymeric material. Preferably, the clamshell container 60 is molded as a single component in the open condition as shown in FIG. 5. Advantageously, the clamshell container 60 is easily removable from the mold due to its generally planar, outwardly extending halves 61, 62 interconnected by the bendable closure hinge portion 63. The clamshell container 60 is also easily removable from the mold due to the deployment hinge portion 95 which permits the first deployment end portion 90 to be molded in a position with a positive die angle. It will further be appreciated that the deployment hinge portion 95 and the closure hinge portion 63 are each preferably formed as one integral piece with the clamshell container 60 as integral living hinges.

As best shown in FIG. 5, the module 30 preferably includes a mounting bracket 80 having a vertically elongated central bracket portion 82 and laterally bent first and second apertured bracket ends 83, 84. The first apertured bracket end 83 has a first end opening 88 sized for receiving the plain end 42 of the inflator 40 therein and the second apertured bracket end 84 has a second end opening 89 sized for receiving the elongated inflator rod 45 of the inflator 40 therein. The first and second end openings 88, 89 preferably have centers which are coaxially aligned such that the elongated axis of the inflator 40 extends parallel to, but spaced above, the elongated central bracket portion 82 in the assembled condition. The mounting bracket 80 further includes a set of outwardly projecting first and second mounting fasteners, 79, 81, respectively, connected to the elongated central bracket portion 82 and spaced for alignment with the fastener apertures 74 in the second half 62 of the clamshell container 60. The mounting fasteners 79, 81 securely connect the central bracket portion 82 to the seat frame 21 such that the central bracket portion 82 remains generally undeformed during air bag inflation, as described further hereinafter.

The mounting bracket 80 includes a first cantilevered portion 75 cantilevered outwardly from the central bracket portion 82 adjacent the first mounting fastener 79 and a second cantilevered portion 76 cantilevered outwardly from the central bracket portion 82 adjacent the second mounting fastener 81. The first and second cantilevered portions 75, 76 are each designed with a predetermined strength which allows generally equal predetermined deformation of both the cantilevered portions 75, 76 during air bag 50 inflation such that the centers of the first and second end openings 88, 89 of the mounting bracket 80 remain coaxially aligned and such that the elongated axis of the inflator 40 remains generally parallel to the elongated central bracket portion 82 located between the first and second mounting fasteners 79, 81 during air bag 50 inflation, as described further hereinafter. It will be appreciated that the predetermined strength of the cantilevered portions 75, 76 may be controlled by a predetermined thickness, cross-section, or ribs located on the first and second cantilevered portions 75, 76 which allows absorption of energy and generally equal deformation of the cantilevered portions 75, 76 during air bag 50 deployment.

It will be appreciated that the mounting bracket 80 has a height less than that of the inflator 40 including the elongated inflator rod 45 such that the threaded end portion 46 of the elongated inflator rod 45 extends out beyond the second apertured bracket end 84 for attachment of an end nut 85 thereto to secure the mounting bracket 80 to the inflator The mounting fasteners 79, 81 of the mounting bracket 80 are suitably attached to any vehicle 12 structure, such as the seat frame 21 or a suitable projection Welded to the seat frame 21. Thus, the entire module 30 can be easily removably mounted on the vehicle 12 by the use of the mounting bracket 80 with mounting fasteners 79, 81 and secured in place, such as by mounting nuts 86.

Preferably, an apertured spacer 77 is sized for receiving the elongated inflator rod 45 therethrough and is positioned between the second apertured bracket end 84 and the discharge end 43 of the inflator 40 for positioning the mounting bracket 80 relative the inflator 40. Preferably, the spacer 77 has an upper tapered end 78 corresponding with an angled portion 87 on the second cantilevered portion 76. It will be appreciated that the spacer 77 including the tapered end 78 is disposed on the inflator 40 by slip-fitted connection, but could also be integrally formed on the inflator 40 or could threadably engage the inflator 40.

The tapered end 78 of the spacer 77 and the tapered second side opening 54 of the neck portion 52 of the air bag 50 cooperatively ensure proper assembly of the air bag 50 on the inflator 40 and cooperatively provide positive location of the air bag 50 on the inflator 40 during deployment as will now be described. To assemble the air bag 50 to the inflator 40, the tapered spacer 77 is slipped onto the elongated inflator rod 45 and then the elongated inflator rod 45, tapered spacer 77 and discharge end 43 of the inflator 40 must be axially inserted into the larger first side opening 53 of the neck portion 52 of the air bag 50. Insertion is continued until the tapered end 78 of the spacer 77 is tightly captured and positioned within the tapered second side opening 54 of the neck portion 52 of the air bag 50. The larger plain end 42 of the air bag 50 is sized larger than the tapered second side opening 54, thus ensuring that the air bag 50 cannot be attached to the inflator 40 upside down. While the air bag 50 shown in the drawings is generally symmetrical, this feature is especially useful with an air bag which is not generally symmetrical and which is also contemplated for use with this invention. Upon air bag deployment, the interference fit between the tapered second side opening 54 of the air bag 50 and the tapered end 78 of the spacer 77 of the inflator 40 maintains the proper location of the air bag 50 on the inflator 40 by reducing axial sliding movement of the air bag 50 relative the inflator 40 and also by reducing rotation of the air bag 50 about the inflator 40 during the discharge of inflator gas. The angled portion 87 on the mounting bracket 80 also additionally ensures proper installation of the mounting bracket 80 relative the air bag 50 and inflator 40 since the angled portion 87 of the mounting bracket 80 must be aligned with the tapered end 78 of the spacer 77 and closely captures the air bag 50 between the spacer 77 and angled portion 87 in the assembled condition described below.

Referring to FIGS. 5 and 6, the module 30 is assembled as follows. Initially, an air bag subassembly is assembled which preferably includes the air bag 50, the mounting bracket 80, the spacer 77, and the inflator 40. First, the elongated inflator rod 45 of the inflator 40 is axially slipped through the apertured spacer 77. Next, the inflator 40, with the elongated inflator rod 45 and spacer 77 leading, are slid through the first side opening 53 of the neck portion 52 of the air bag 50 until the tapered end 78 of the spacer 77 achieves an interference fit with the tapered second side opening 54, as described in detail above, and wherein the threaded end portion 46 of the elongated inflator rod 45 extends out beyond the second side opening 54 and the discharge end 43 of the inflator 40 is positioned within the neck portion 52 for discharging gas into the main body portion 51 of the air bag 50.

Next, the first apertured bracket end 83 is axially slid up over the plain end 42 of the inflator 40 until the second apertured bracket end 84 is above the elongated inflator rod 45. Next, the second apertured bracket end 84 is axially pushed onto the elongated inflator rod 45 of the inflator 40 until the second apertured bracket end 84 engages the spacer 77 to prevent the first apertured bracket end 83 from slipping off the plain end 42. Next, the end nut 85 is secured to the threaded end portion 46 of the elongated inflator rod 45 to securely attach and position the mounting bracket 80 relative the inflator 40 and air bag 50. It will further be appreciated that the first and second apertured bracket ends 83, 84 capture the air bag 50 therebetween to additionally position the air bag 50 relative the inflator 40. Finally, the air bag 50 is folded into a compact shape preferably including upper and lower longitudinally extending folds and a plurality of accordion-type pleat folds to complete the air bag subassembly.

It will be appreciated that other methods of assembling the mounting bracket 80 to the inflator 40 and air bag 50 are also possible. One such preferred method for automated assembly of the air bag subassembly is as follows. The neck portion 52 of the air bag 50 is placed adjacent the elongated central bracket portion 82 of the mounting bracket 80 with the first side opening 53 of the air bag 50 being coaxially aligned with the first end opening 88 of the mounting bracket 80 and with the second side opening 54 of the air bag 50 being aligned with the second end opening 89 of the mounting bracket 80. The spacer 77 is slid onto the inflator 40 as described above. Next, the inflator 40 with the elongated inflator rod 45 and spacer 77 leading, is sequentially slid through the first end opening 88 of the first apertured bracket end 83, the first side opening 53 of the air bag 50, the second side opening 54 of the air bag 50, and the second end opening 89 of the second apertured bracket end 84 until the threaded end portion 46 of the elongated inflator rod 45 extends out beyond the second end opening 89 of the mounting bracket 80 and the spacer 77 engages but does not pass through the second end opening 89 of the mounting bracket 80. Next, the end nut 85 is secured to the threaded end portion 46 of the elongated inflator rod 45 to securely attach and position the mounting bracket 80 relative the inflator 40 and air bag 50. Thus, the inflator 40 acts like a pin which threads the air bag 50 and mounting bracket 80 together.

The module 30 assembly is easily completed as follows. As best shown in FIG. 5, the clamshell container 60 is placed in the open condition and the mounting fasteners 79, 81 on the mounting bracket 80 are matably aligned with the fastener apertures 74 on the second half 62 of the clamshell container 60. The air bag subassembly including the air bag 50, the inflator 40 and the mounting bracket 80, is placed into the second half 62 of the clamshell container 60 with the mounting fasteners 79, 81 inserted out through the fastener apertures 74. It will be appreciated that the folded air bag 50, inflator 40 and mounting bracket 80 are easily placed within the clamshell container 60 in the open condition since the closure hinge portion 63 enables the first and second halves 61, 62 to be opened 180 degrees apart in a generally planar condition.

Next, the first half 61 of the clamshell container 60 is simply folded over approximately 180° degrees and positioned atop the second half 62 as shown in FIG. 6. The first deployment end portion 90 is folded over approximately 90 degrees and closed and matably aligned with the second deployment end portion 91 such that the lip portions 94 engage each other. To complete the module assembly, the lip portions 94 of the first and second deployment end portions 90, 91 are then releasably connected to each other, such as by ultrasonic welding, to maintain the clamshell container 60 in the closed condition until air bag deployment. In the closed condition, the clamshell container 60 maintains the air bag 50 in the folded condition. Also in the closed condition, the clamshell container 60 substantially encapsulates the air bag 50, inflator 40 and mounting bracket 80 and prevents entry of foreign articles into the module 30. As best shown in FIG. 6, the respective perimetric edges 66 including the hinged, end and deployment edges 67, 68, 69 of the first and second halves 61, 62 are aligned with each other and substantially abut each other when the clamshell container 60 is in the closed condition.

As best shown in FIG. 1, the module 30 may be attached to any suitable vehicle 12 structure and is particularly well-adapted for use in narrow vehicle locations with limited space such as the seat back 20 or seat bottom 19 or vehicle side structure. The module 30 is preferably attached to the seat frame of the seat back 20 by simply securing the mounting fasteners to the seat frame 21, such as by use of mounting nuts 86.

Upon the sensing of predetermined vehicle 12 conditions, the inflator 40 generates inflator gas out through the ports 44 on the discharge end 43 and into the main body portion 51 of the air bag 50. The inflating air bag 50 forcibly breaks apart and separates the lip portions 94 of the first and second deployment end portions 90, 91 such that the air bag 50 can deploy between the first and second halves 61, 62 of the clamshell container 60. It is desirable that the deployment hinge portion 95 be stronger than the connection of the lip portions 94 such that the deployment hinge portion 95 does not tear open during air bag deployment. Thus, the thickness of the deployment hinge portion 95 and the ultrasonic welding, heat staking or other fastening of the lip portions 94 must be suitably tuned to obtain that objective.

As best shown in FIG. 3, during initial inflation the lip portions 94 break apart and the first deployment end portion 90 flaps open and rotates about the deployment hinge portion 95 outwardly towards the door 14, while the second deployment end portion 91 remains in generally the same position. Thus, the deployment end portions 90, 91 can advantageously be used to cooperatively bias and direct initial inflation of the air bag 50 outwardly towards the door 14. In addition, rotation of the first deployment end portion 90 about the deployment hinge portion 95 creates a greater air bag opening 56 through which the inflating air bag 50 can deploy. Upon further air bag 50 inflation, the first and second halves 61, 62 of the clamshell container 60 rotate partially open about the closure hinge portion 63 for deployment of the air bag 50 therebetween to the fully inflated condition shown in FIGS. 2 and 4. During air bag deployment, the interference fit between the tapered second side opening 54 of the air bag 50 and the tapered end 78 of the spacer 77 of the inflator 40 maintains the proper location of the air bag 50 on the inflator 40 by reducing axial sliding movement of the air bag 50 relative the inflator 40 and also by reducing rotation of the air bag 50 about the inflator 40 during the discharge of inflator gas.

Figure 8:
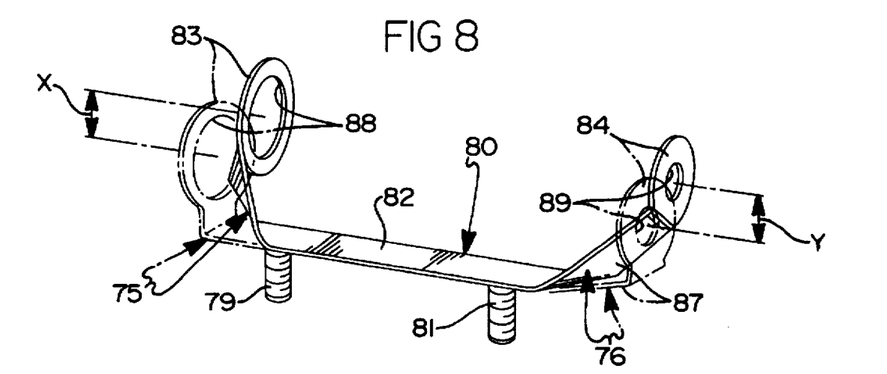
FIG. 8 is a perspective view of a mounting bracket of the module of FIGS. 1-6 shown in solid-lines in a deformed condition and shown in phantom lines in an undeformed condition.

Referring to FIG. 8, advantageously during normal air bag inflation, the mounting bracket 80 absorbs energy by deforming to reduce the energy transmitted to the air bag 50 and to lower the stresses that must be endured by the air bag 50 during inflation. It will be appreciated that the mounting bracket 80 includes the first and second cantilevered portions 75, 76 and the central bracket portion 82 located between the first and second mounting fasteners 79, 81. The central bracket portion 82 is securely restrained and prevented from deformation during air bag inflation by the attachment of the first and second mounting fasteners 79, 81 to the seat frame 21. However, the first and second cantilevered portions 75, 76 are deformed a predetermined amount during air bag inflation in the direction of the inflating air bag 50. Thus, the first and second cantilevered portions 75, 76 of the mounting bracket 80 advantageously deform during air bag inflation to reduce the stresses transmitted to the air bag 50. Most preferably, the first and second cantilevered portions 75, 76 each have a predetermined strength such that they each deform a generally equal amount in the direction of the inflating air bag 50. Thus, the centers of the first and second end openings 88, 89 on the mounting bracket 80 remain coaxially aligned after deformation. Accordingly, the elongated axis of the inflator 80 advantageously remains generally parallel with the central bracket portion 82 upon deformation. Thus, the air bag 50 deploys in the intended direction and does turn at an angle during inflation since the first and second cantilevered portions 75, 76 deform a generally equal amount in the direction of inflation such that the elongated axis of the inflator 40 remains parallel with its original position prior to air bag inflation. Thus, the first and second cantilevered portions 75, 76 of the mounting bracket 80 each deform in generally equal amounts in the direction of air bag inflation, shown designated as X and Y in FIG. 8.

Advantageously, the clamshell container 60 permits greater flexibility in packaging such that the clamshell container 60 can be sized to exactly fit the desired size and packaging of the folded air bag 50 and inflator 40 within a narrow vehicle 12 location. It will further be appreciated that the clamshell container 60 is easily molded due to the closure hinge portion 63 and the deployment hinge portion 95 which permit placement of the halves 61, 62 and the first deployment end portion 90, respectively, during molding to a position having a positive die angle for easy removal from the mold.

It will be understood that a person skilled in the art may make modifications to the preferred embodiment shown herein within the scope and intent of the claims. For example, although the clamshell container 60 is shown as having two generally half-cylindrical halves 61, 62, it will be appreciated that the first and second halves 61, 62 may be virtually any geometric shape. It will further be appreciated that while the closure hinge portion 63 and the deployment hinge portion 95 are preferably shown as one continuous strip, the closure and deployment hinge portions 63, 95 may also be discontinuous or may extend less than the height of the clamshell container 60 in the case of more complex curvatures. While the first deployment end portion 90 of the clamshell container 60 is preferably rotatable approximately 90 degrees about the deployment hinge portion 95, it will be appreciated that the first deployment end portion 90 may be rotatable more or less than 90 degrees depending on the amount of rotation desired for achieving a positive die angle and for directing the air bag 50. Although the preferred embodiment shows the mounting bracket 80 packaged within the clamshell container 60, it will be appreciated that the mounting bracket 80 could also be attached to the outside of the clamshell container 60 or that the inflator 40 and mounting bracket 80 could be positioned within the neck portion 52 of the air bag 50. It will further be appreciated that the mounting bracket 80 and spacer 77 could be eliminated and that the mounting fasteners 79, 81 could be mounted directly on the inflator 40 and extend out through the air bag 50 and clamshell container 60 for attachment to the vehicle 12. While the preferred embodiment shows the spacer 77 located upward in the module 30, it will also be appreciated that the first and second side openings 53, 54 of the neck portion 52 could be switched and the tapered spacer 77 could be located towards the bottom of the module 30.

It will be appreciated that the closure hinge portion 63 and the deployment hinge portion 95 both advantageously enable easy positioning of the clamshell container 60 within the mold so that positive die angles can be achieved for ease of removal from the mold. It will further be appreciated that the clamshell container 60 may have additional living hinge portions positioned between the closure hinge portion 63 and the deployment edges 69 when needed for easy removal of the clamshell container 60 from the mold. Advantageously, the closure hinge portion 63 serves the additional purpose of permitting rotation of the first and second halves 61, 62 of the clamshell container 60 between the open and closed conditions for easy installation of the air bag subassembly. Also advantageously the deployment hinge portion 95 serves the additional purposes of permitting pivotal movement of the first deployment end portion 90 for flapping open to provide a wider air bag opening 56 through which the air bag 50 deploys and also for directing the deploying air bag 50. Thus, it will further be appreciated that the first and second deployment end portions 90, 91 may be a larger portion of the clamshell container 60 for providing an even wider air bag opening 56 and for providing additional guidance to the deploying air bag 50.

Figure 7:
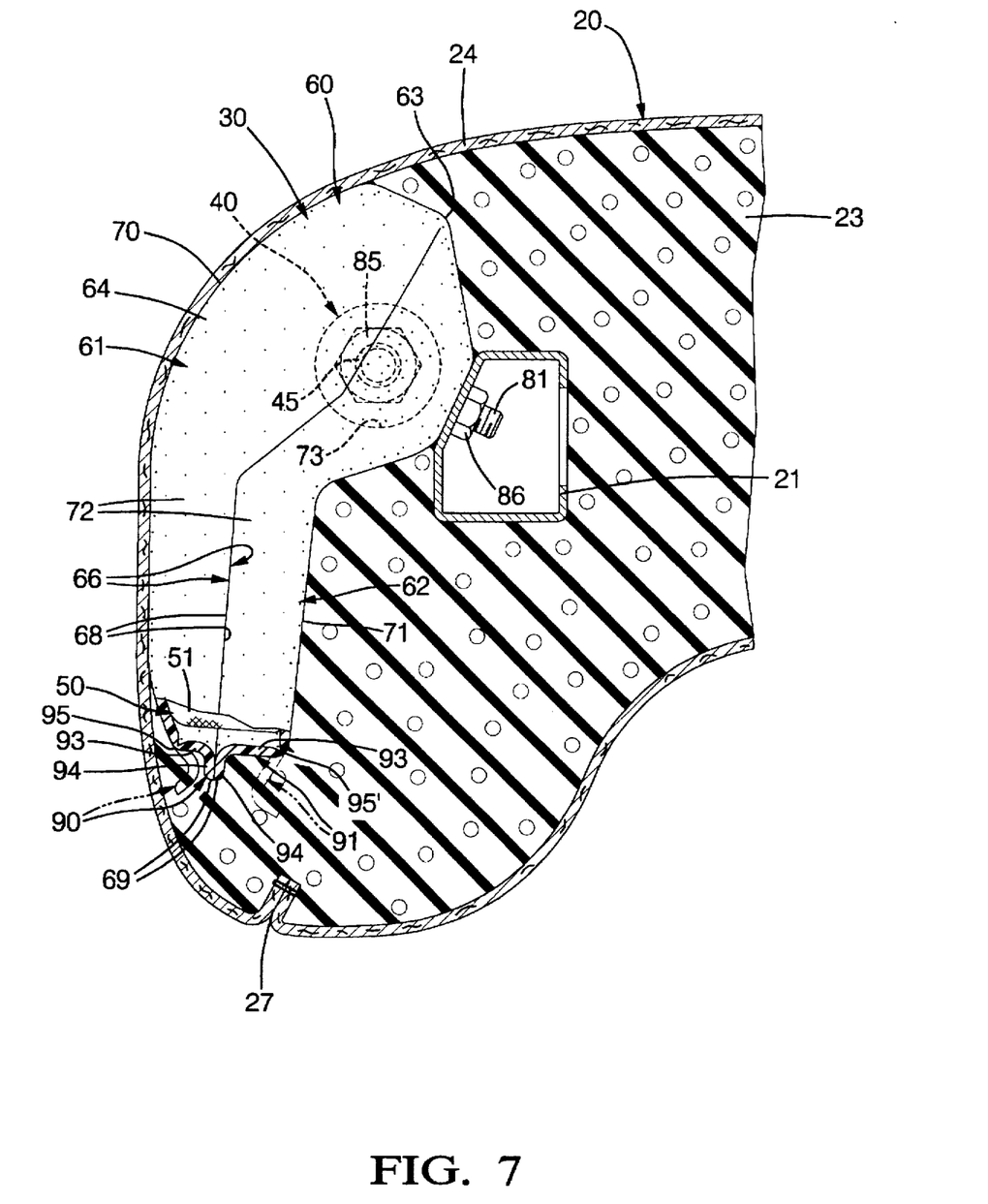
FIG. 7 is a section view similar to FIG. 3, but showing an alternate embodiment of the invention.

It will further be appreciated that the second deployment end portion 91 may be pivotally connected to the second half 62 of the clamshell container 60 in a similar manner to the first deployment end portion 90. FIG. 7 shows an alternate embodiment of the invention similar to that shown in FIGS. 1–6, with similar parts denoted by similar numerals. However, the clamshell container 60 includes an additional deployment hinge portion 95' which pivotally connects the second deployment end portion 91 to the second half 62 of the clamshell container 60.

Figure 9:
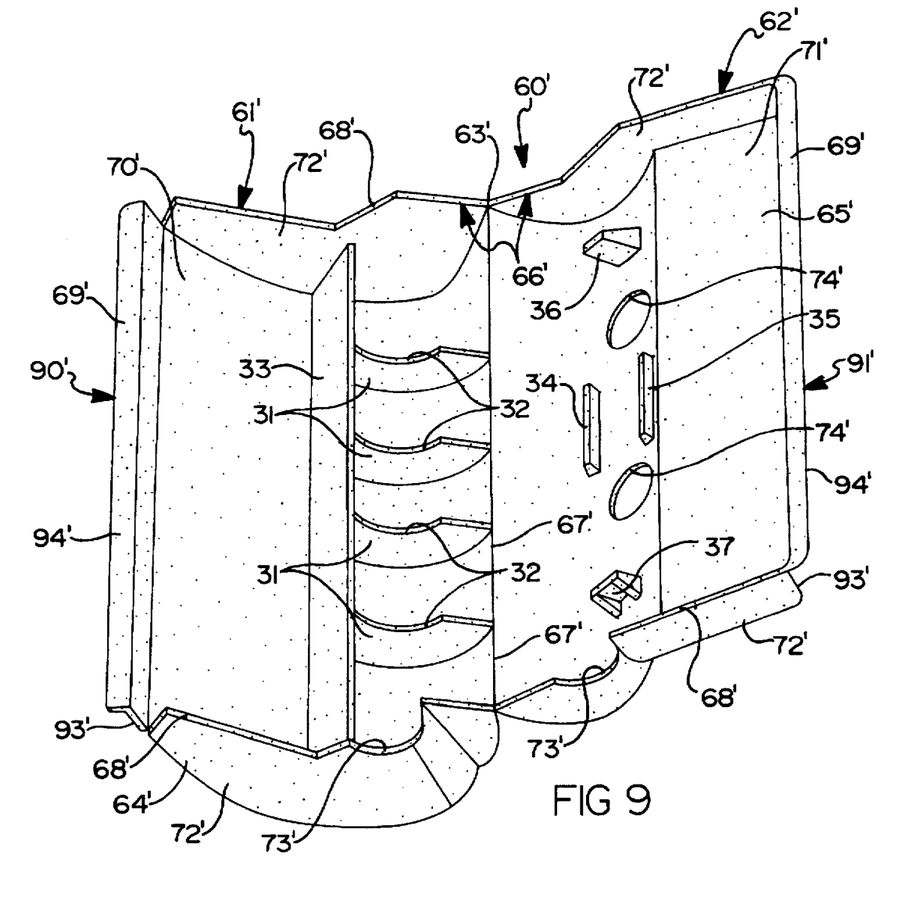
FIG. 9 shows yet another alternate embodiment of the air bag module, showing a clamshell container in an open condition.
Figure 10:
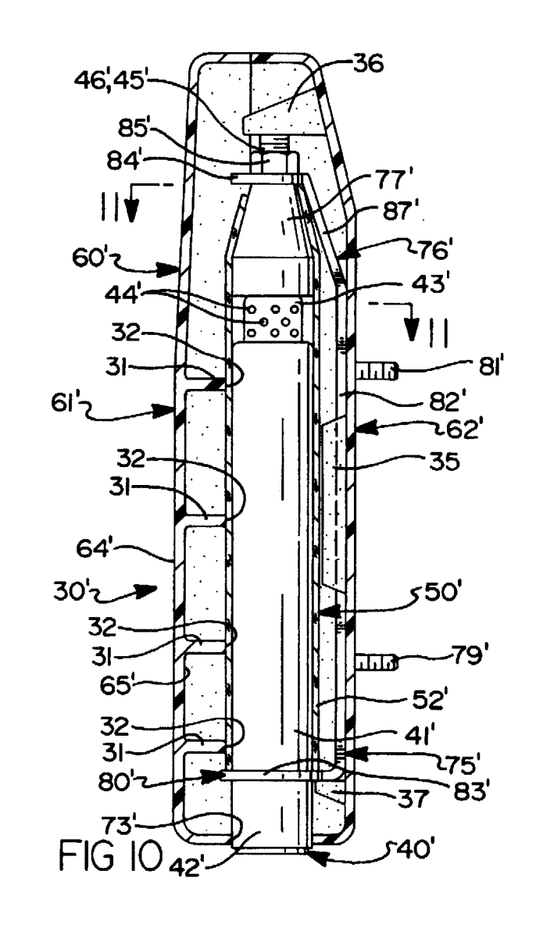
FIG. 10 shows a partially-sectioned view of the air bag module of the alternate embodiment of FIG. 9 in the assembled condition.
Figure 11:
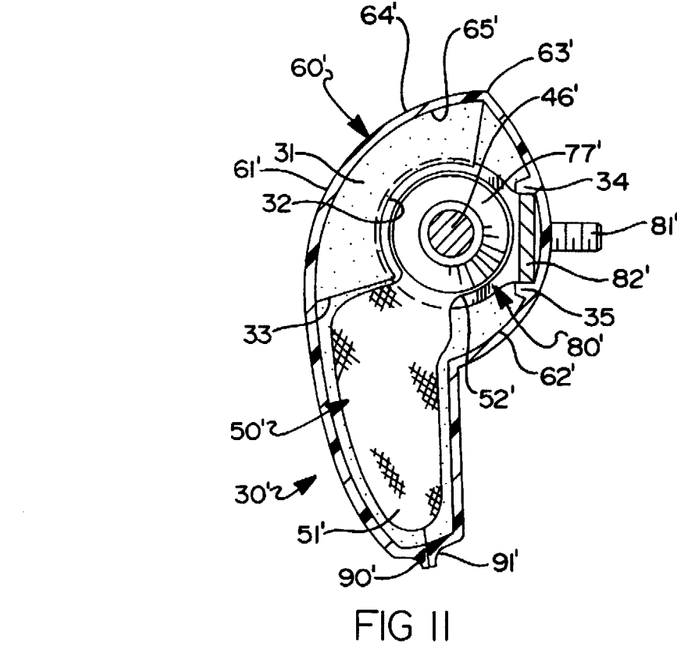
FIG. 11 shows a sectional view of the air bag module as viewed along line 11—11 of FIG. 10.

FIGS. 9–11 show an alternate embodiment of the invention in which features having a similar description to those described in FIGS. 1–8 are denoted with similar reference numerals having a prime. A clamshell container 60' includes additional features to the clamshell container 60 shown in FIGS. 1–6, but with the remainder of the components having a similar description.

As best shown in FIG. 9, the clamshell container 60' has a generally planar, open condition in which the first and second halves 61', 62' each extend outwardly from the closure hinge portion 63'. The first and second halves 61', 62' are pivotally connected by the closure hinge portion 63'. The closure hinge portion 63' preferably permits pivotal movement of the first and second halves 61', 62' at least 180 degrees relative each other. Thus, the clamshell container 60' is foldable to a closed condition in which the first and second halves 61', 62' are positioned atop each other as best shown in FIGS. 10 and 11.

As best shown in FIG. 9, the clamshell container 60' has an outer surface 64' and an inner surface 65'. The first and second halves 61', 62' of the clamshell container 60' each preferably have a generally half-cylindrical shape further defined by perimetric edges 66' including hinged edges 67' integrally attached to the closure hinge portion 63', free end edges 68' and deployment edges 69'.

As best shown in FIG. 9, the clamshell container 60' includes an outboard side wall 70' on the first half 61', and an inboard side wall 71' on the second half 62', and two pairs of opposing end walls 72'. Preferably, the lower pair of end walls 72' cooperatively defines an inflator opening 73' through which an electrical connector (not shown) for the inflator 40' extends when the module 30' is assembled. The inboard side wall 71' on the second half 62' preferably includes a set of fastener apertures 74' for receiving mounting fasteners 79', 81' of the mounting bracket 80' therethrough. The walls 70', 71' 72' of the clamshell container 60' cooperatively define a substantially enclosed volume in which the air bag 50', inflator 40' and mounting bracket 80' are stored prior to air bag deployment.

The clamshell container 60' includes a first deployment end portion 90' preferably located longitudinally forward on the first half 61' and a second deployment end portion 91' preferably located longitudinally forward on the second half 62'. The first and second deployment end portions 90', 91' preferably each include a laterally extending portion 93' and an outwardly projecting lip portion 94'. The lip portions 94' of the deployment end portions 90', 91' are releasably connected to each other prior to air bag deployment. Upon air bag inflation, the air bag 50' forcibly separates the lip portions 94' of the first and second deployment end portions 90', 91' from each other and deploys therebetween. Preferably, the lip portions 94' of the deployment end portions 90', 91' are connected to each other by ultrasonic welding or by heat staking to hold the clamshell container 60' in the closed condition.

Referring to FIG. 9, an inner surface 65' of the first half 61' of the clamshell container 60' includes a plurality of vertically spaced apart ribs 31 preferably having a semi-circular shape and preferably extending perpendicular to the elongated axis of the inflator 40'. The ribs 31 each have an inner edge 32 shaped for closely receiving the inflator 40' therein to restrain movement of the inflator 40' relative the clamshell container 60' when the module 30' is in a closed condition. The ribs 31 are especially useful when the inflator 40' and the air bag 50' do not substantially fill the volume of the clamshell container 60'. Advantageously, the ribs 31 act as spacers which cooperatively define an interior volume of the clamshell container 60' which is less than the overall volume of the clamshell container 60'. Thus, the ribs 31 take up space within the clamshell container 60' and maintain the position of the inflator 40' and air bag 50' within the clamshell container 60', as best shown in FIGS. 10 and 11. Preferably, the ribs 31 are integrally molded with the clamshell container 60'.

A generally planar reaction surface 33 preferably extends vertically across the first half 61' of the clamshell container 60' and preferably extends across and engages each of the ribs 31. The reaction surface 33 generally serves as a divider between a neck portion 52' and a main body portion 51' of the air bag 50'. Upon air bag deployment, the reaction surface 33 prevents interaction of the main body portion 51' of the air bag 50' with the ribs 31 and serves as a uniform surface against which the air bag 50' may react during deployment. Preferably, the reaction surface 33 is also integrally molded with the clamshell container 60'. The reaction surface 33 also advantageously defines the interior volume in which the main body portion 51' of the air bag 50' is stored within the clamshell container 60'. Also advantageously, the reaction surface 33 serves as a strengthening feature of the clamshell container 60'.

An inner surface 65' of the second half 62' of the clamshell container 60' includes first, second, third and fourth locating features 34, 35, 36, 37, respectively, for positioning an air bag subassembly including the air bag 50', the inflator 40' and the mounting bracket 80' within the clamshell container 60' during assembly. The first and second locating features 34, 35 are preferably a pair of spaced apart opposing tabs located between the fastener apertures 74' through which first and second mounting fasteners 79', 81' are received during assembly. The first and second apertures 74' are preferably sized slightly larger than the mounting apertures 79', 81' for easy assembly. However, the mounting bracket 80' may shift during assembly or during shipping to the vehicle location. The first and second locating features are preferably spaced apart less than a width of a central bracket portion 82' of the mounting bracket 80' for an interference fit therewith during assembly, as best shown in FIG. 11, to position and hold the mounting bracket 80' relative the clamshell container 60'.

As best shown in FIGS. 9 and 10, the third and fourth locating features 36, 37 are vertically spaced apart, opposing tabs positioned such that the third locating feature 36 engages the threaded end portion 46' of the inflator 40' during assembly and the fourth locating feature 37 engages a first apertured bracket end 83' of the mounting bracket 80' to vertically position the air bag subassembly during assembly into the second half 62' of the clamshell container 60'. Preferably, the third and fourth locating features 36, 37 are spaced apart such that there is a net fit with the inflator 40' and mounting bracket 80' during assembly.

Advantageously, the locating features 34, 35, 36, 37 and the ribs 31 positively position and hold the mounting bracket 80', the inflator 40' and the air bag 50' to prevent movement thereof within the clamshell container 60' prior to attachment to the vehicle. As best shown in FIG. 10, the third locating feature 36 advantageously acts as a reaction surface to hold the inflator 40' in position when an electrical connector (not shown) is axially pushed onto a plain end 42' of the inflator 40' after the module 30' is completely assembled.

It will be appreciated that by using the ribs 31, reaction surface 33 and locating features 34, 35, 36, 37 for spacing and positioning, the same air bag subassembly components of the inflator 40', the air bag 50' and the mounting bracket 80' may be packaged in a variety of sizes and geometries of clamshell containers 60'.

While the present embodiment has been described as carried out in a specific embodiment thereof, it is not intended to be limited thereby, but is intended to cover the invention broadly within the scope and spirit of the claims.

What is claimed is:

1. An air bag module in a vehicle comprising:
   an inflator for generating inflator gas;
   an air bag deployable upon generation of inflator gas, the air bag secured to the inflator;
   a mounting bracket attached to the inflator, the mounting bracket adapted to secure the inflator to the vehicle; and
   the inflator including opposing ends and the mounting bracket having a central portion secured to the vehicle, the mounting bracket having first and second cantilevered portions, each of the cantilevered portions extending outwardly from the central portion and engaging an end of the inflator, the cantilevered portions each having a predetermined strength such that the cantilevered portions each deform in the direction of the deploying air bag such that the mounting bracket absorbs energy during air bag inflation by predetermined deformation of the cantilevered portions.

2. The module of claim 1 wherein the predetermined strengths of the first and second cantilevered portions are such that the predetermined deformations of the first and second cantilevered portions are generally equal.

3. The module of claim 1 wherein the inflator has an elongated axis and wherein the elongated axis of the inflator is generally parallel to the central portion of the mounting bracket prior to air bag inflation and wherein each of the cantilevered portions has a predetermined strength such that the cantilevered portions deform generally equally during air bag inflation such that the elongated axis of the inflator remains generally parallel to the central portion of the mounting bracket upon deformation of the cantilevered portions.

4. The module of claim 1 wherein each of the first and second cantilevered portions include laterally bent ends having first and second end openings, respectively, each engaging an end of the inflator and wherein the first and second end openings are coaxially aligned prior to air bag inflation and wherein the first and second cantilevered portions each have a predetermined strength and deform a predetermined amount in the direction of air bag inflation such that the first and second end openings remain coaxially aligned after deformation of the first and second cantilevered portions during air bag inflation.

5. The module of claim 4 wherein one of the cantilevered portions includes an angled portion adjacent the laterally bent end to assist in positioning the inflator.

6. The module of claim 4 wherein the air bag is slip-fittedly mounted on the inflator and wherein the air bag is trapped on the inflator between the bent ends of the mounting bracket.

7. The module of claim 1 wherein the central portion of the mounting bracket includes outwardly protruding fasteners for securing the inflator to the vehicle.

8. An air bag module in a vehicle comprising:
   an inflator for generating inflator gas;
   an air bag deployable upon generation of inflator gas, the air bag secured to the inflator;
   a mounting bracket attached to the inflator, the mounting bracket adapted to secure the inflator to the vehicle;
   a container for housing the air bag and inflator therein, the container having walls defining a substantially enclosed container volume; and
   the inflator including an elongated inflator axis and the container including a plurality of spaced apart ribs extending perpendicular to the elongated axis and wherein the ribs define an internal volume of the container being less then the container volume for positioning the inflator and air bag within the container and for restraining movement of the inflator relative to the container.

9. The module of claim 8 wherein the container including the ribs is integrally molded as one piece.

10. The module of claim 8 wherein the container includes a reaction surface extending perpendicular to and engaging the ribs, the reaction surface for engaging the air bag and preventing the air bag from interacting with the ribs during air bag inflation.

11. The module of claim 10 wherein the container including the ribs and the reaction surface are integrally molded as one piece.

12. An air bag module in a vehicle comprising:
   an inflator for generating inflator gas;
   an air bag deployable upon generation of inflator gas, the air bag secured to the inflator;
   a mounting bracket attached to the inflator, the mounting bracket adapted to secure the inflator to the vehicle:
   a container for housing the air bag and inflator therein, the container having walls defining a substantially enclosed container volume, the container including a plurality of locating features for positioning the mounting bracket and inflator within the container during assembly; and
   the locating features including a plurality of tabs integrally molded with the container.

13. The module of claim 12 wherein the plurality of tabs include at least one pair of spaced apart, opposing tabs.

14. The module of claim 13 wherein the at least one pair of spaced apart, opposing tabs are spaced for an interference fit with the mounting bracket.

* * * * *